(12) United States Patent
Vänttinen

(10) Patent No.: US 6,601,207 B1
(45) Date of Patent: Jul. 29, 2003

(54) METHOD AND A DEVICE FOR RE-TRANSMITTING DATA TRANSFER PACKETS

(75) Inventor: Veijo Vänttinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/517,206

(22) Filed: Mar. 2, 2000

(30) Foreign Application Priority Data

Mar. 3, 1999 (FI) .................................................. 990467

(51) Int. Cl.$^7$ ................................................ H04L 1/16
(52) U.S. Cl. ........................................................ 714/748
(58) Field of Search ........................................ 714/748

(56) References Cited

U.S. PATENT DOCUMENTS

| | | | |
|---|---|---|---|
| 5,440,545 A | * 8/1995 | Buchholz et al. ............ | 370/426 |
| 5,444,718 A | 8/1995 | Ejzak et al. .................. | 371/32 |
| 5,717,689 A | * 2/1998 | Ayanoglu ..................... | 370/349 |
| 5,727,002 A | 3/1998 | Miller et al. .................. | 371/32 |
| 5,784,362 A | * 7/1998 | Turina ......................... | 370/321 |
| 6,269,080 B1 | * 7/2001 | Kumar ......................... | 370/236 |
| 6,367,045 B1 | * 4/2002 | Khan et al. ................... | 714/748 |

FOREIGN PATENT DOCUMENTS

| EP | 0938207 A2 | 8/1999 |
|---|---|---|
| EP | 0959589 A3 | 11/1999 |

OTHER PUBLICATIONS

"Efficient Transmission Of ARQ Feedback For EGPRS Radio Link Control" K. Balachandran et al., IEEE VTS 50$^{th}$ Vehicular Technology Conference, vol. 3, pp 1663–1669, 1999.

* cited by examiner

Primary Examiner—Stephen M. Baker
(74) Attorney, Agent, or Firm—Perman & Green, LLP

(57) ABSTRACT

A method comprising transmitting a set of data blocks, receiving said set of data blocks, checking whether the transfer of the received data blocks has succeeded or failed; acknowledging, at specific intervals, the received data blocks by a bitmap. A bit of the bitmap corresponds to at least one transferred data block, and the value of the bit indicates the success or failure of the data transfer. Data blocks, the transfer of which has failed according to the bitmap, are re-transmitted. The method comprises determining a set of acknowledgement algorithms, each of which comprising a method for forming a bitmap of the received data blocks; maintaining information on the number of those data blocks, which have not been successfully received or the reception of which has not been acknowledged; initiating one of said acknowledgment algorithms by selecting the acknowledgement algorithm according to said number of data blocks. The acknowledgement functions can at any given instant be adapted to the temporary transfer situation.

18 Claims, 4 Drawing Sheets

METHOD AND A DEVICE FOR RE-TRANSMITTING DATA TRANSFER PACKETS

FIELD OF THE INVENTION

The present invention relates to packet mode data transfer and, particularly, to a method and a device for re-transmitting data blocks. The method comprises transmitting a set of data blocks, receiving said set of data blocks, checking whether the transfer of the received data blocks has succeeded or failed, acknowledging at specific intervals the received data blocks with a bitmap, a bit of which corresponds to at least one transferred data block, and the value of the bit indicates the success or failure of the data transfer, and re-transmitting the data blocks the transfer of which has failed according to the bitmap. The device is arranged to implement a method according to the invention.

BACKGROUND OF THE INVENTION

In data transfer, a packet typically means a data block presented in binary form, which is arranged in a specific form for data transfer. Normally, a packet comprises a heading, which contains, e.g. control data, such as synchronization bits, a target address, the sender's address, the length of the packet, payload, which contains the data to be transferred and a tail part, which normally contains data intended for the identification and correction of errors. In packet mode data transfer, data is divided into parts and by adding to the parts the required control and error correction data packets are formed which are transmitted and acknowledged substantially independently.

Acknowledging is a commonly used error controlling procedure in packet mode data transfer. Acknowledging means a character or character string, which the party who has received the data returns to the party who has transmitted the data in order to indicate whether the transmission has succeeded or failed. Typically, the transmitting party who does not receive an acknowledgement, or gets an acknowledgement indicating that the transmission has failed, re-transmits the data.

Data transfer over a radio interface is susceptible to transfer errors and, thus, methods by means of which the reliability and correctness of the transferred data is checked and possibly corrected are crucial in this kind of data transfer.

However, in order to detect transfer errors, it is possible to only add a limited amount of data to data blocks so that the already initially scarce radio resource could be utilized as efficiently as possible.

Circuit switched transmission mode in the GSM system (Global System for Mobile Telecommunications), standardised by the ETSI (European telecommunications Standards Institute), enables a data transfer rate of 9.6 kbps. Due to the demand for higher transfer rates, the ETSI has specified a set of GSM improvements known as GSM Phase 2+. GMS Phase 2+ specifies a new feature, which is called GPRS (General Packet Switched Radio Service). GPRS enables packet switched data transfer in a mobile communication network and, in addition, connections can be provided with a high rate packet switched transmission channel by assigning them a larger proportion of the transfer frames used in communication.

In FIG. 1, a GPRS radio interface is illustrated by means of logical layer hierarchy. A physical layer 1 divides into two sublayers divided on the basis of functionalities. A physical RF layer 1a modulates physical wave forms on the basis of bit sequences received from a physical link layer 1b and, correspondingly, demodulates the received wave forms into bit sequences for being supplied to the physical link layer. The physical link layer 1b contains functionalities for transferring data through a physical channel between a mobile station and a network and uses the services of the physical RF layer. These functionalities also comprise error detection and correction for the physical layer. A lower part 2 of the data link layer is also determined by means of two functionalities. The RLC/MAC layer 2 provides services for data transfer. A MAC (Medium Access Control) 2a comprises functionalities by means of which the distribution of transfer capacity for the network and for the mobile station is controlled. An RLC 2b comprises functions for segmenting the packet data blocks of an upper LLC (Logical Link Layer) 3 into RLC data blocks for transmission and the gathering of the received RLC data blocks into LLC data blocks. RLC also comprises functions for implementing Backward Error Correction (BEC). Of the LLC data blocks, segmented data blocks of an upper SNDCP (Subnetwork Dependent Convergence Protocol) layer 4 are gathered, and the data blocks according to the packet data protocol used by the mobile station are unpacked from these data blocks.

Clause 9 of the ETSI GSM 04.60 version 6.1.0 release 1997 describes GPRS RLC functions in packet mode data transfer between peer entities and, particularly, error detection and re-transmission procedure during data transfer. FIG. 2 illustrates a re-transmission method according to the GPRS system, in its basic form. A block 4 represents a transmitting unit which in data transfer in uplink direction is a mobile station and in data transfers in downlink direction is, for example, a base transceiver station of a mobile communication system. A block 5 represents a receiving unit which, respectively, in data transfer in uplink direction is, for example, a base transceiver station of a mobile communication system and in data transfer in downlink direction is a mobile station. Hereinafter, the transmitting and receiving units are referred to with the terms Transmitter (TX) and Receiver (RX), respectively.

In GPRS, a mobile station remains registered with a network (idle mode), but a channel is or channels are only reserved for the connection for actual data transfer. Traffic formed of successive RLC blocks is called Temporary Block Flow (TBF). Each RLC block comprises a Block Sequence Number (BSN) seven bits in length. A send state variable V(S) is maintained in the transmitter 4, the send state variable denoting the sequence number of the next-in-sequence data block to be transmitted at any given time. A transmitter acknowledge state variable V(A) is also maintained in the transmitter 4, the transmitter acknowledge state variable denoting the BSN for the oldest RLC block that has not been positively acknowledged by the receiver 5. In addition to these, an acknowledge state array V(B), wherein information on the acknowledgement status of the k previous RLC blocks is being stored, is also maintained in the transmitter.

In the receiver 5, a receive state variable V(R) is maintained, the receive state variable denoting the BSN of the next-in-sequence RLC data block expected to be received. A receive window state variable V(Q) is also maintained in the transmitter, the receive window stat variable denoting the BSN for the last RLC block, which has not yet been received. A receive state array V(N), wherein information on the receive status of k previous RLC blocks is being stored, is also maintained in the receiver 5. Thus, the reception window of the receiver corresponds to the BSNs of the k blocks so that $V(Q) \leq k < V(R)$.

The receiver contains a set of algorithms for detecting transfer errors in the received blocks. Error detection is well known to a person skilled in the art, and there is no reason to present it here in more detail. On receiving data block, the receiver checks whether the data transfer has succeeded or not, and if the BSN of the received block is between [V(Q),V(R)] and the transfer of the data block was successful, a receive state array V(N) element that corresponds to the data block is given the value RECEIVED. In other case, the receive state array V(N) element is given the value INVALID.

Data transfer acknowledgement is carried out with a Packet Ack/Nack message, which the receiver sends to the transmitter. The Packet Ack/Nack message comprises a Starting Sequence Number (SSN) and a Received Block Bitmap (RBB), which is formed of the receive state array V(N) so that the SSN is given the value of the variable V(R) and the RBB bits corresponds to the values of the receive state array indexed in relation to said SSN. If the receive state array element has the value RECEIVED, the value of the bits is "1", if the receive state array value is INVALID, the bit value is "0".

On receiving a Packet Ack/Nack message, the transmitter 4 marks for the element, indexed in relation to the receive state array V(N) SSN, the value ACKED if the value of the bit that corresponds to the element is "1". If the bit value is "0", the value NACKED is marked for the acknowledge state array V(B) element. The transmitter 4 sends at any given time the data block that corresponds to the oldest element of the V(B) array, the value of the data block being NACKED. When the data block has been transmitted, PENDING_ACK is marked as the value of the element. If none of the acknowledge state array V(B) elements has the value NACKED and the data block is contained in the determined window $k(V(S)<V(A)+k)$, a data block that corresponds to the send state variable V(S) will be transmitted, and the value PENDING_ACK is marked for the acknowledge stat array V(B) element corresponding to it.

In a situation where the difference between the value of the send state variable V(S) and the value of the acknowledge state variable V(A) reaches the value k set on the window and in the acknowledgement array, there are no elements that had the value NACKED, no new data blocks can be transmitted until acknowledgements for older data blocks are received. This situation is called transmission window stall. In connections utilizing multi-time slots, a transmission window stalls easily because it is necessary to monitor in one window all the data blocks that are transmitted in successive time slots of the same frame, although the round-trip delay is relatively long. The window k is rather short for this purpose, e.g. in the GPRS standard, k=64. At the moment, an enhance GPRS system (Enhanced GRPS, EGPRS) is being standardized under the ETSI, wherein the number of data blocks to be sent from a transmitter can be doubled in cases where a connection relatively free of interference is in use. Thus, with a solution according to prior art the transmission window stall will be even more problematic.

Naturally, the easiest solution is to increase the size of the window and, correspondingly, that of the bitmap, whereupon the acknowledgement process speeds up and the transmission window will not stall as easily. However, because the size of a Packet Ack/Nack message is specific, and it should also be possible to transfer data (e.g. measurement data) relating to other functions in connection with it, the increase of the bitmap size has limits.

SUMMARY OF THE INVENTION

Now, a method and a device implementing the method have been invented, by means of which the effect of the problem presented above can be significantly mitigated. It is characteristic of a method according to the invention that it comprises determining a set of acknowledgement algorithms each of which comprises a method for forming a bitmap of the received data blocks; maintaining information on the number of those data blocks which were not successfully received or the reception of which has not been acknowledged; and initiating one of said acknowledgement algorithms, selecting the acknowledgement algorithm according to said number of data blocks.

An objective of the invention is also a data transfer device and a data transfer system.

The invention is based on the idea that the aim to avoid the transmission window stall by monitoring the number of data blocks in the reception window and by controlling the acknowledgement procedure according to said number in an optimized manner.

According to a second embodiment of the invention, the solution presented above is enhanced preferably by also monitoring the number of data blocks in the transmission window and by also specifying the acknowledgement procedure according to this number.

BRIEF DESCRIPTION OF THE DRAWINGS

Next, the invention will be described in detail by referring to the accompanying drawings, in which.

DETAILED DESCRIPTION

During a temporary block flow, the receiver sends the transmitter a Packet Ack/Nack message according to a typical signalling system, the message comprising information relating to the state of the received RLC blocks and, at the same time, also transfers many other pieces of information to the receiver. Table 1 shows the fields of a Packet Uplink Ack/Nack message and Table 2 shows the fields of a Packet Donwlink Ack/Nack message Packet DL Ack/Nack. In the second column of the table, the fields that must be present in each message are marked with the letter M, and the fields that do not have to be included in each message are marked with the letter O.

TABLE 1

| Packet UL Ack/Nack Fields | M/O | Length |
| --- | --- | --- |
| Message Type | M | 6 |
| Uplink TBF Identification | M | 7 |
| Channel Coding | M | 2 |
| Ack Description | M | 72 |
| Contention Resolution | O | 1–33 |
| Timing Advance | O | 1–16 |
| TS Allocation/Power Control Parameters | (M) | 9–53 |
| Fixed Allocation | O | 1–N |

TABLE 2

| Packet UL Ack/Nack Fields | O M/O | Length |
| --- | --- | --- |
| Message Type | M | 6 |
| Downlink [f] | M | 5 |
| Ack Description | M | 72 |
| Channel Quality Report | M | 23–71 |
| TBF Release | M | 1 |
| Channel Request Description | O | 1–25 |
| Suspend Request | O | 1–n*20 |

As can be noted in the tables, e.g. Packet Uplink Ack/Nack contains, among other things, data for timing advance updating and power control. Packet Downlink Ack/Nack contains, e.g. data relating to the quality of the channel in use. Packet Ack/Nack comprises a starting sequence number SSN and a received block bitmap RBB. When generating an acknowledgement message, the receiver sets on the SSN the value of the variable V(R), and each bitmap bit value represents the reception state of the receive state array V(N) element indexed in order in relation to the SSN. Because the value of the variable V(R) is constantly changing, the window is thus sliding in sequence number space.

Figure 3:
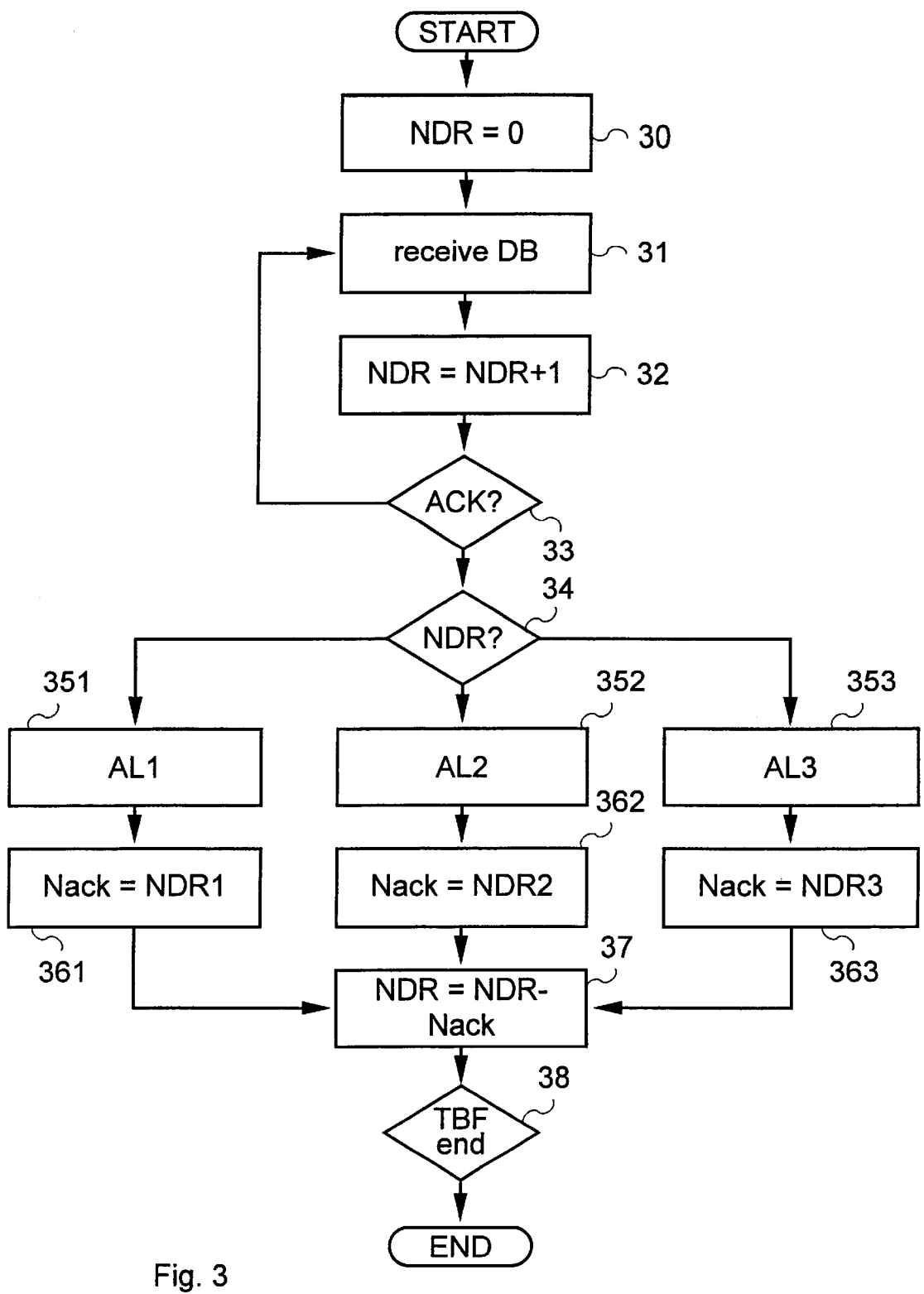
FIG. 3 is a flow diagram illustrating a procedure according to the invention for arranging acknowledgements and re-transmissions.

In GPRS system according to prior art, the lengths of a window and a bitmap correspond to each other. When the window length is increased, the acknowledgement procedure must be changed so that the sliding of the window would still be possible. The flow diagram in FIG. 3 illustrates a method according to the invention for arranging acknowledgements and re-transmissions.

In step 30, a figure NDR is initialized, the figure representing the number of data blocks in the reception window. In step 31, a new data block BD is received from the transmitter, whereupon the figure NDR is raised by one (step 32). According to the available acknowledgement procedure, it is checked whether an acknowledgement message should be transmitted (step 33). If not, it will be moved to step 31 to receive a new DB. If an acknowledgement message must be sent, the temporary NDR value will be checked (step 34). If NDR meets a condition B1, an acknowledgement algorithm AL1 will be performed (step 351), which comprises a method for forming a bitmap of the received data blocks and by means of which $N_{ack}=N_{DR1}$ data blocks can be acknowledge (step 361). If NDR meets a condition B2, an acknowledgement algorithm AL2 will be performed (step 352) by means of which $N_{ack}=N_{DR2}$ data blocks can be acknowledged (step 362). If NDR meets a condition B3, an acknowledgement algorithm AL3 will be performed (step 353) by means of which $N_{ack}=N_{DR3}$ data blocks can be acknowledge (step 363). Here, the number of conditions and that of the algorithms corresponding to them is three, but the number can be selected according to the application. The number of acknowledged data blocks $N_{ack}$ is subtracted from the figure NDR (step 37). If the last data block was the last data block of the temporary block flow TBF, the process will end. If the block flow continues (step 38), it will again be moved to step 31 to receive new data blocks.

In the GPRS system the size of a window has been specified to be 64 and the bitmap length has been specified to be 64. In the new EGPRS system, both the transmission and reception window will probably be specified to be bigger. In the following preferred embodiment of the invention, a window is used the size of which is 512. When the window size is this big, the optimized use of a bitmap is particularly important. The aim is to use as small a bitmap as possible for taking into account the limitations of the Packet Ack/Nack message and still be able to acknowledge the received data blocks as quickly as possible to prevent stall. In the presented embodiment, the conditions relate to the ranges of variation specified for NDR so that:

E1: $NDR \leq 64$

E2: $64 < NDR \leq 128$

E3: $128 < NDR \leq 256$

E4: $256 < NDR \leq 512$

The corresponding algorithms are:

AL1 ($NDR \leq 64$)

Figure 1:
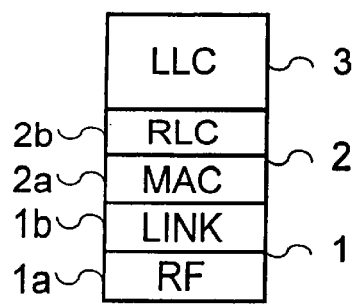
FIG. 1 illustrates a GPRS radio interface illustrated by a logical layer hierarchy (prior art).
Figure 2:
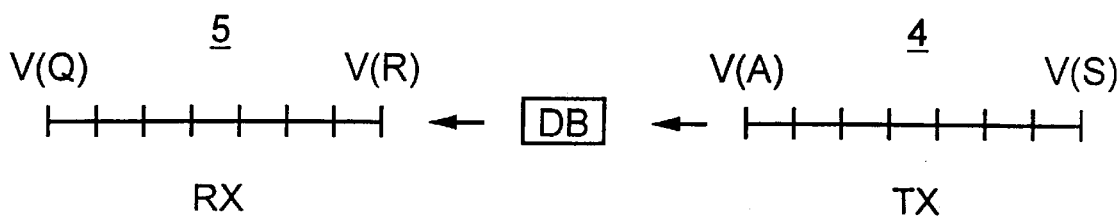
FIG. 2 illustrates a re-transmission procedure according to the GPRS system (prior art)
Figure 4:
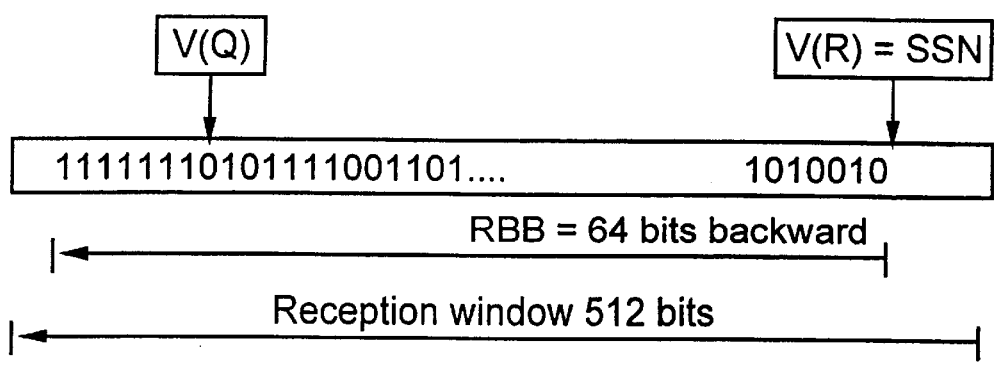
FIG. 4 illustrates an acknowledgement algorithm according to the invention.

When NDR is relatively small, SSN gets the value V(R) and the bitmpa RBB 64 bits in length comprises information 64 on a previously received data block as shown in FIG. 4. The window length k is 512, but as long as NDR remains this low, acknowledgement with a smaller bitmap will be sufficient.

AL2 ($64 < NDR \leq 128$)

Figure 5:
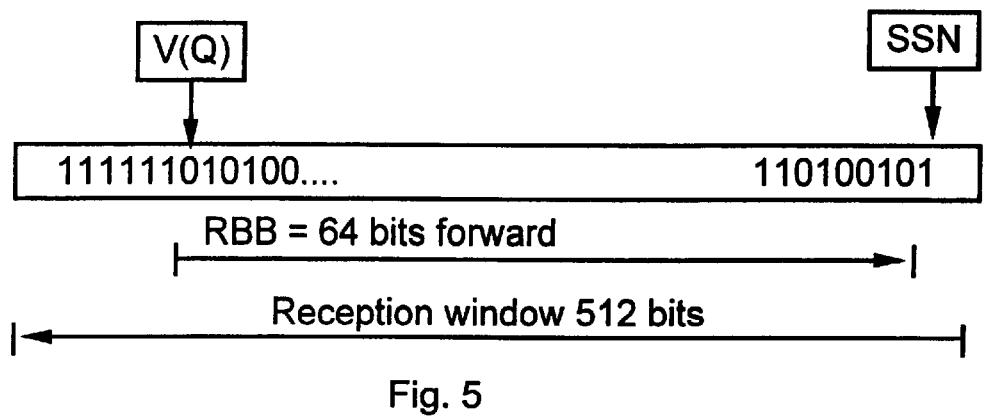
FIG. 5 illustrates another acknowledgement algorithm according to the invention.

When NDR exceeds the first threshold value 64, SSN is determined in relation to V(Q) so that SSN=[V(Q)+64] mod 1024 as shown in FIG. 5. This means that because V(Q) indicates the oldest RLC block that was not acceptably received, the data blocks that precede the value of V(Q) can be implicitly acknowledged and the bitmap explicitly acknowledges the 64 data blocks subsequent to the value V(Q), explicitly. If the overall number of the implicitly acknowledged bits and the bitmap bits is smaller than NDR, data blocks will still remain unacknowledged, in which case these will be acknowledged in connection with the next acknowledgement. The bitmap can still be kept 64 bits long.

AL3 ($128 < NDR \leq 256$)

When NDR exceeds the second threshold value 128, a new acknowledgement algorithm AL3 will be used. In the algorithm, first the bitmap is studied and it is examined whether it could be compressed by certain pre-selected compression methods (e.g. string coding, etc) into smaller than the first threshold value. If the threshold value can be gone under, the compression is carried out and the acknowledgement procedure according to the algorithm AL1 will be followed for other functions. Bit string compression and decompression solutions are well known to a person skilled in the art and, therefore, they will not be described here in more detail.

If the NDR value cannot be compressed with certain methods to below the first threshold value, SSN will be determined as the algorithm AL2 in relation to the variable V(Q), but in order to speed up the process, a larger bitmap will be used. To enable this, one or more fields in the Packet/Ack message are temporarily left un-transmitted, preferably alternative fields (in Tables 1 and 2, fields O). For example, in a Packet Uplink Ack/Nack message, a 128-bit bitmap can be temporarily included in the message by leaving the Reservation Decision, Timing Advance, and Fixed Allocation un-transmitted. Correspondingly, in a Packet Downlink Ack/Nack message, a 128-bit bitmap can be temporarily included in the message by leaving the measurement results (field Channel Quality Report) un-transmitted, also alternative fields Channel Request Description and Interruption Request. In this case, the 128-bit bitmap can be transmitted in every other donwlink Packet Ack/Nack message so that the channel measurement results can be reported to the network in a manner required by the system.

AL4 (256<NDR≦512)

When NDR is relatively high, it is preferable to use different types of acknowledgement algorithms in uplink and downlink directions. The reason for this is that more limitations are directed to a Packet Downlink Ack/Nack message than to a Packet Uplink Ack/Nack message.

Downlink Direction (Receiver=Mobile Station)

In the receiver, it is first studied and checked whether the bitmap could be compressed into a bitmap 128 bits in length by means of the implicit acknowledgement presented above and well-known compression methods. If it can be compressed, said compressed bitmap RBB=128 is transmitted according to the algorithm AL3, and SSN=[V(Q)+128] mod 1024 is determined.

Figure 6:
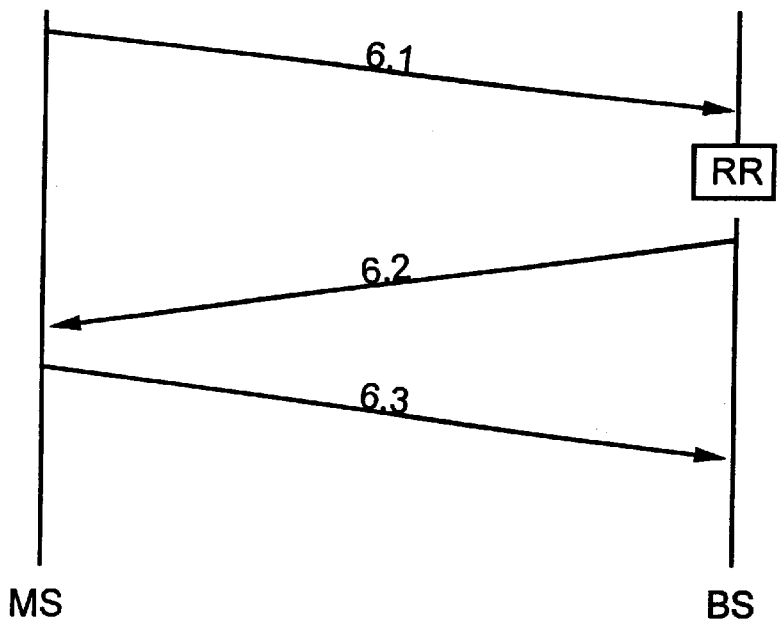
FIG. 6 is a signalising diagram illustrating a Polling Request message according to the invention.
Figure 7:
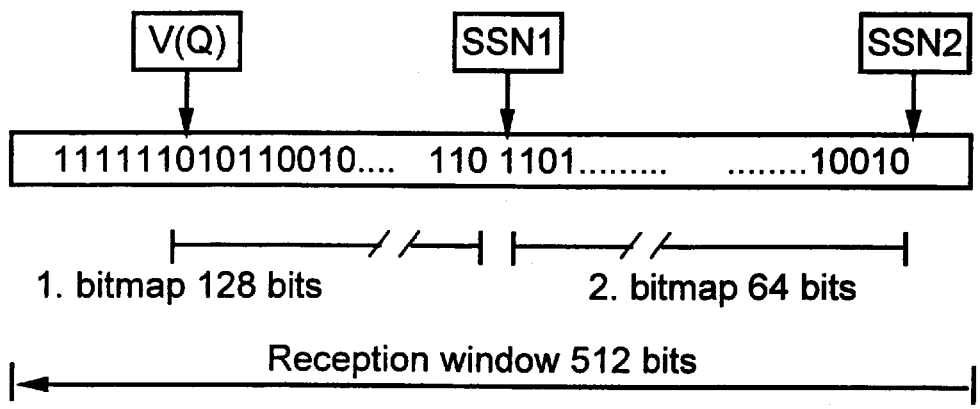
FIG. 7 illustrates the use of two bitmaps.

If this is not possible, it will be proceeded according to the signalling diagram shown in FIG. 6. The mobile station sends the network a Polling Request message (6.1), wherein it informs the network of the need to send two successive Packet Downlink Ack/Nack messages. The network allocates a radio resource RR according to the request and when requesting acknowledgement next time, it informs the mobile station in the Polling Request message (6.2) that it can send successively two bitmaps as shown in FIG. 7. In the example shown in the figure, SSN1=[V(Q)+128] mod 1024 and SSN2=[V(Q)+64] mode 1024, i.e. first, a 128-bit bitmap is sent and then a 64-bit bitmap. The mobile station acknowledges the transmission with an acknowledgement message that contains said two bitmaps (6.3).

It should be understood that the set of algorithms may simply comprise a single algorithm containing the necessary functionality to produce different bitmaps according to transmission conditions.

As can be seen on the basis of what was presented above, with a method according to the invention, acknowledgement functions can each time be adapted to the transfer situation, whereupon the acknowledgement and re-transmission procedure will be enhanced and the transmission window stall will be diminished without bringing about substantial changes in the system difficult to implement and without impeding the transfer of other data communicated with the help of acknowledgement messages.

In the embodiment presented above, the number of data blocks is examined in the reception window. A corresponding function can also be arranged at the transmission end in which case a corresponding figure NDT is used in relation to a transmission window. NDT represents the number of data blocks in the transmission window which have been transmitted but not acknowledged. When certain thresholds are reached, a transmitter requests appropriate acknowledgements from a receiver, for example, when the figure NDT exceeds a given threshold value, e.g. 350, the transmitter allocates for the acknowledgement request a higher radio resource and expresses in the acknowledgement request a command to the mobile station to send in the acknowledgement message two bitmaps as described in the algorithm AL4.

Figure 8:
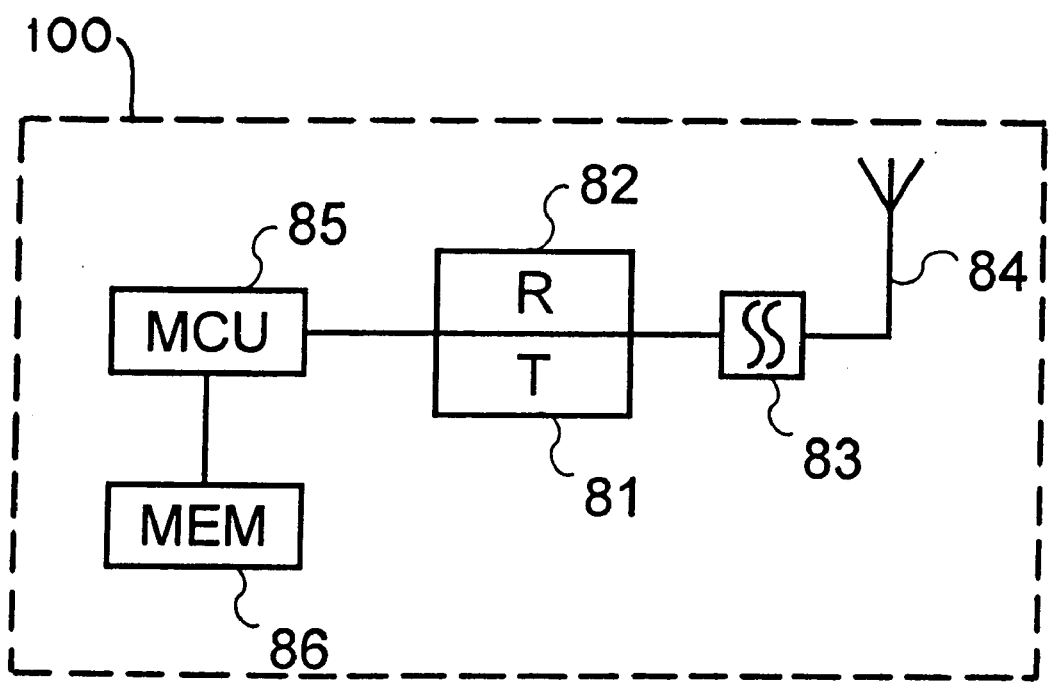
FIG. 8 illustrates an embodiment of a data transfer device according to the invention.

With the help of the block diagram shown in FIG. 8, an embodiment of the invention can be illustrated, wherein the number of re-transmissions is being monitored in a mobile station MS, a base station, or other network element 100. The block diagram in FIG. 8 describes the functionalities of the mobile station's transmission and reception parts. The mobile station includes a radio unit for communicating on a radio path, the radio unit comprising a transmission branch known from a conventional mobile station (comprising functional blocks that carry out channel coding, interleaving, encryption, modulation, and transmission) 81, a reception branch (comprising functional blocks that carry out reception, demodulation, decryption, de-interleaving, and channel decoding) 82, a duplex filter 83 that separates reception and transmission for a transmission on a radio path, and an antenna 84. The operation of the terminal is controlled by a main control circuit MCU 85, which comprises a memory MEM 86. The MCU, 85 implements those functionalities according to the communication protocol, which at the mobile station end take care of re-transmissions. In a mobile station according to the invention, a set of acknowledgement algorithms are loaded in the memory 86 of the MCU 85, from which the MCU 35 selects, according to the criteria presented above, and implements an acknowledgement algorithm in a manner presented above.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. For example, a transmitter according to the invention can by any terminal or network element suitable for wireless packet-mode data transmission. The embodiments presented should be considered illustrative, but not restricting. Thus, the possibilities of implementing and using the invention are only restricted by the enclosed patent claims. Consequently, the various options of implementing the invention as determined by the claims, including the equivalent implementations, also belong to the scope of the invention.

What is claimed is:

1. A method for re-transmitting data blocks, the method comprising:

transmitting a set of data blocks;

receiving said set of data blocks;

checking whether the transfer of the received data blocks has succeeded or failed;

acknowledging, at specific intervals, the received data blocks with a bitmap, a bit of which corresponds to at least one transferred data block, and the value of the bit indicates the success or failure of the data transfer;

re-transmitting the data blocks for which transfer has failed according to the bitmap;

wherein the method further comprises;

determining a set of acknowledgement algorithms each of which comprises a method for forming a bitmap of the received data blocks, where at least one of the set of acknowledgement algorithms comprises compressing the bitmap into a smaller number of bits:

maintaining information on the number of those data blocks, not successfully received or successfully received, but not yet acknowledged;

initiating one of said acknowledgement algorithms selecting the acknowledgement algorithm according to said number of data blocks.

2. A method according to claim 1, wherein the method comprises maintaining said number of data blocks in a receiving unit.

3. A method according to claim 1, wherein the method comprises maintaining said number of data blocks in a transmitting unit.

4. A method according to claim 1, wherein said data blocks are RLC data blocks of the EGPRS system.

5. A method according to claim 1, wherein the method comprises maintaining information on the success of the data transfer of the received data blocks in a reception window, the element of which corresponds to at least one received data block, and the window having a determined length.

6. A method according to claim 5, wherein the window length is 512 bits.

7. A method according to claim 1, wherein the length of the bitmap has at least two options.

8. A method according to claim 1 wherein the data blocks are re-transmitted from a mobile station.

9. A method according to claim 1 wherein the data blocks are re-transmitted from a base transceiver station that is communicating with a mobile station.

10. A method according to claim 1, wherein the method comprises transmitting, in response to said number of data blocks passing a determined threshold value, an acknowledgement request that contains a request to send two successive bitmaps.

11. A method according to claim 1, wherein the method comprises:
   determining for the bitmap at least two possible sizes;
   checking, in response to said number of data blocks passing a determined threshold value, whether the bitmap that corresponds to the number could be compressed into its smallest available size.

12. A data transfer device for receiving data blocks comprising:
   means for receiving data blocks;
   means for checking the success of the transfer of the received data blocks;
   means for sending an acknowledgement, at specific intervals, of the received data blocks with a bitmap, a bit of which corresponds to at least one transferred data block, and the value of the bit indicates the success or failure of the data transfer;
   wherein
   a set of acknowledgement algorithms are arranged in the device, each of the algorithms comprising a method for forming a bitmap of the received data blocks, where at least one of the set of acknowledgement algorithms comprises compressing the bitmap into a smaller number of bits;
   the device comprises means for monitoring the number of those data blocks, not successfully received;
   the device comprises means for selecting one acknowledgement algorithm according to said number of data blocks; and
   the device comprises means for initiating the selected acknowledgement algorithm.

13. A data transfer device suitable for transmitting data blocks comprising:
   means for transmitting data blocks;
   means for receiving an acknowledgement, at determined intervals, of received data blocks with a bitmap, a bit of which corresponds to at least one transferred data block, and the value of the bit indicates the success or failure of the data transfer;
   means for re-transmitting those data blocks for which transfer has failed according to the received bitmap;
   wherein
   a set of acknowledgement algorithms are arranged in the device, each of the algorithms comprising a method for forming a bitmap of the received data blocks, where at least one of the set of acknowledgement algorithms comprises compressing the bitmap into a smaller number of bits;
   the device comprises means for monitoring a number of those data blocks, successfully received, but not yet acknowledged; and
   the device comprises means for requesting a bitmap based on an acknowledgement algorithm which is selected according to said number of data blocks.

14. A device according to claim 12, wherein the device is a mobile station.

15. A device according to claim 13, wherein the device is a mobile station.

16. A device according to claim 12, wherein the device is a base transceiver station of a mobile communication system.

17. A device according to claim 13, wherein the device is a base transceiver station of a mobile communication system.

18. A data transfer system transmitting data blocks, which comprises:
   communication devices for transferring and receiving data blocks of which at least part comprises means for checking the success of the transfer of the received data blocks;
   communication devices for transmitting and receiving, at specific intervals, an acknowledgement of the received data blocks with a bitmap, a bit of which corresponds to at least one transferred data block and the value of the bit indicates the success or failure of the data transfer;
   communication devices for re-transmitting the data blocks for which transfer has failed according to the received bitmap;
   wherein
   a set of acknowledgement algorithms are arranged in at least one device, each of the algorithms comprising a method for forming a bitmap of the received data blocks, where at least one of the set of acknowledgement algorithms comprises compressing the bitmap into a smaller number of bits;
   said device comprises means for monitoring the number of those data blocks which have not been successfully received or the reception of which has not been acknowledged;
   said device comprises means for selecting one acknowledgement algorithm according to said number of data blocks; and
   said device comprises means for initiating the selected acknowledgement algorithm.

* * * * *

UNITED STATES PATENT AND TRADEMARK OFFICE
CERTIFICATE OF CORRECTION

PATENT NO. : 6,601,207 B1
DATED : July 29, 2003
INVENTOR(S) : Veijo Vanttinen

It is certified that error appears in the above-identified patent and that said Letters Patent is hereby corrected as shown below:

Column 10,
Line 62, after claim 18, please insert the following:
19. A method according to claim 1, wherein the compressing the bitmap comprises compressing the bitmap to a number of bits below a predetermined number.

Signed and Sealed this

Twenty-third Day of March, 2004

JON W. DUDAS
*Acting Director of the United States Patent and Trademark Office*